United States Patent
Barbalho et al.

(10) Patent No.: US 11,360,862 B2
(45) Date of Patent: Jun. 14, 2022

(54) SYSTEM AND METHOD FOR MANAGING BACKUP OPERATIONS OF STORAGE DEVICES IN A BACKUP STORAGE SYSTEM USING CLUSTER EVALUATIONS BASED ON USAGE TELEMETRY

(71) Applicant: EMC IP Holding Company LLC, Hopkinton, MA (US)

(72) Inventors: Hugo de Oliveira Barbalho, Rio de Janeiro (BR); Tiago Salviano Calmon, Rio de Janeiro (BR); Eduardo Vera Sousa, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 56 days.

(21) Appl. No.: 17/083,477

(22) Filed: Oct. 29, 2020

(65) Prior Publication Data

US 2022/0138053 A1    May 5, 2022

(51) Int. Cl.
| | |
|---|---|
| *G06F 12/00* | (2006.01) |
| *G06F 11/14* | (2006.01) |
| *G06F 3/06* | (2006.01) |

(52) U.S. Cl.
CPC .......... *G06F 11/1469* (2013.01); *G06F 3/067* (2013.01); *G06F 3/0614* (2013.01); *G06F 3/0619* (2013.01); *G06F 3/0629* (2013.01); *G06F 3/0653* (2013.01);
(Continued)

(58) Field of Classification Search
CPC .. G06F 11/1469; G06F 3/0614; G06F 3/0619; G06F 3/0629; G06F 3/0653; G06F 3/0659; G06F 3/067; G06F 11/1451; G06F 11/1461; G06F 11/1464
See application file for complete search history.

(56) References Cited

U.S. PATENT DOCUMENTS

| | | | |
|---|---|---|---|
| 11,196,614 B2* | 12/2021 | Mortensen | H04L 41/16 |
| 2008/0010304 A1* | 1/2008 | Vempala | G06K 9/6224 |

(Continued)

OTHER PUBLICATIONS

D. Reinsel, J. Gantz and J. Rydning, "IDC Data Age 2025," Apr. 2017, 25 pages.

(Continued)

*Primary Examiner* — John A Lane
(74) *Attorney, Agent, or Firm* — Chamberlain, Hrdlicka, White, Williams & Aughtry

(57) ABSTRACT

A method for managing storage devices includes obtaining a storage device cluster request, and in response to the storage device cluster request: obtaining a set of storage device telemetry entries associated with a plurality of storage devices, performing a telemetry normalization on the storage device telemetry entries to obtain a set of normalized entries, performing a pairwise evaluation on the set of normalized entries to obtain a set of initial storage device clusters, wherein a storage device cluster in the set of initial storage device clusters comprises a portion of the plurality of storage devices, performing a cluster re-evaluation on the set of initial storage device cluster groups to obtain a set of updated storage device clusters, updating a backup policy based on the set of updated storage device cluster groups, and performing a backup operation on a storage device based on the backup policy.

20 Claims, 9 Drawing Sheets

(52) U.S. Cl.
CPC ........ *G06F 3/0659* (2013.01); *G06F 11/1451* (2013.01); *G06F 11/1461* (2013.01); *G06F 11/1464* (2013.01)

(56) References Cited

U.S. PATENT DOCUMENTS

| | | | |
|---|---|---|---|
| 2013/0111471 A1* | 5/2013 | Chandrasekaran ... | G06F 9/5077 718/1 |
| 2015/0269241 A1* | 9/2015 | Lee ..................... | G06F 16/285 707/737 |
| 2020/0034718 A1* | 1/2020 | Beedu ................. | G06N 5/02 |

OTHER PUBLICATIONS

W. Xia, H. Jiang, D. Feng, F. Douglis, P. Shilane, Y. Hua, M. Fu, Y. Zhang and Y. Zhou, "A Comprehensive Study of the Past, Present, and Future of Data Deduplication," in Proceedings of the IEEE, 2016, 31 pages.

* cited by examiner

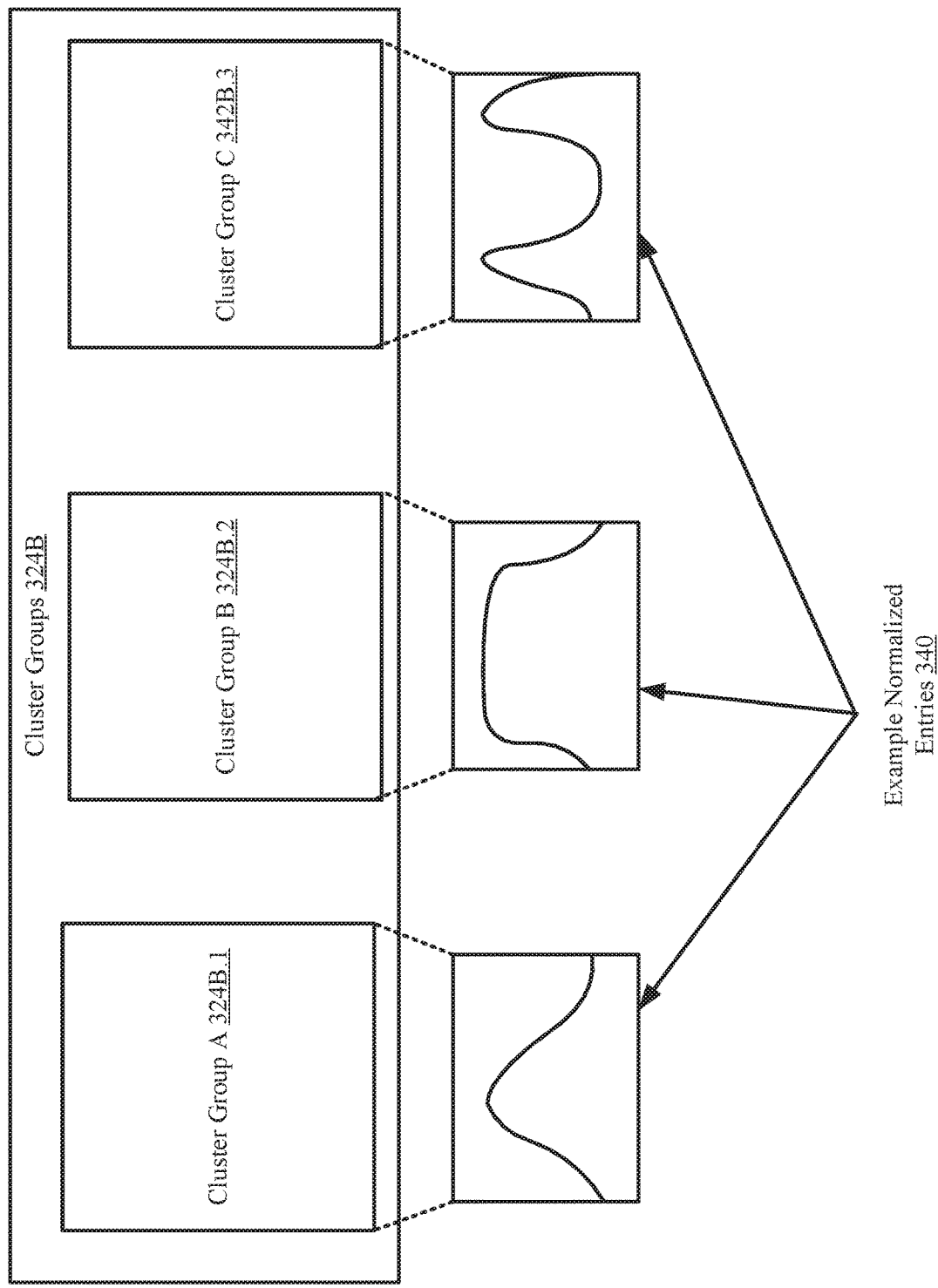

SYSTEM AND METHOD FOR MANAGING BACKUP OPERATIONS OF STORAGE DEVICES IN A BACKUP STORAGE SYSTEM USING CLUSTER EVALUATIONS BASED ON USAGE TELEMETRY

BACKGROUND

Computing devices in a system may include any number of computing resources such as processors, memory, and persistent storage. The computing resources, specifically the persistent storage devices, may be maintained by cleaning policies implemented on storage device pools of storage devices.

SUMMARY

In general, in one aspect, the invention relates to a method for managing storage devices in a backup storage system. The method includes obtaining, by a backup agent, a storage device cluster request, and in response to the storage device cluster request: obtaining a set of storage device telemetry entries associated with a plurality of storage devices, performing a telemetry normalization on the storage device telemetry entries to obtain a set of normalized entries, performing a pairwise evaluation on the set of normalized entries to obtain a set of initial storage device clusters, wherein a storage device cluster in the set of initial storage device clusters comprises a portion of the plurality of storage devices, performing a cluster re-evaluation on the set of initial storage device cluster groups to obtain a set of updated storage device clusters, updating a backup policy based on the set of updated storage device cluster groups, and performing a backup operation on a storage device of the plurality of storage devices based on the backup policy.

In one aspect, the invention relates to a non-transitory computer readable medium that includes computer readable program code, which when executed by a computer processor enables the computer processor to perform a method for managing storage devices in a backup storage system. The method includes obtaining, by a backup agent, a storage device cluster request, and in response to the storage device cluster request: obtaining a set of storage device telemetry entries associated with a plurality of storage devices, performing a telemetry normalization on the storage device telemetry entries to obtain a set of normalized entries, performing a pairwise evaluation on the set of normalized entries to obtain a set of initial storage device clusters, wherein a storage device cluster in the set of initial storage device clusters comprises a portion of the plurality of storage devices, performing a cluster re-evaluation on the set of initial storage device cluster groups to obtain a set of updated storage device clusters, updating a backup policy based on the set of updated storage device cluster groups, and performing a backup operation on a storage device of the plurality of storage devices based on the backup policy.

In one aspect, the invention relates to a system that includes a processor and memory that includes instructions, which when executed by the processor, perform a method. The method includes obtaining, by a backup agent, a storage device cluster request, and in response to the storage device cluster request: obtaining a set of storage device telemetry entries associated with a plurality of storage devices, performing a telemetry normalization on the storage device telemetry entries to obtain a set of normalized entries, performing a pairwise evaluation on the set of normalized entries to obtain a set of initial storage device clusters, wherein a storage device cluster in the set of initial storage device clusters comprises a portion of the plurality of storage devices, performing a cluster re-evaluation on the set of initial storage device cluster groups to obtain a set of updated storage device clusters, updating a backup policy based on the set of updated storage device cluster groups, and performing a backup operation on a storage device of the plurality of storage devices based on the backup policy.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3D show an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup storage system. Specifically, embodiments of the invention include obtaining storage device telemetry associated with a set of storage devices in the backup storage system, and grouping the storage devices into cluster groups based on the storage device telemetry. The cluster groups may be used to update backup policies to specify an optimal point in time in which to initiate backup generation and storage on the storage devices of each cluster group. In this manner, workload bottlenecks (e.g., high workloads at a given point in time) are reduced by specifying the backup initiation and storage at points in time in which workload in the storage devices are predicted to be low.

Figure 1A:
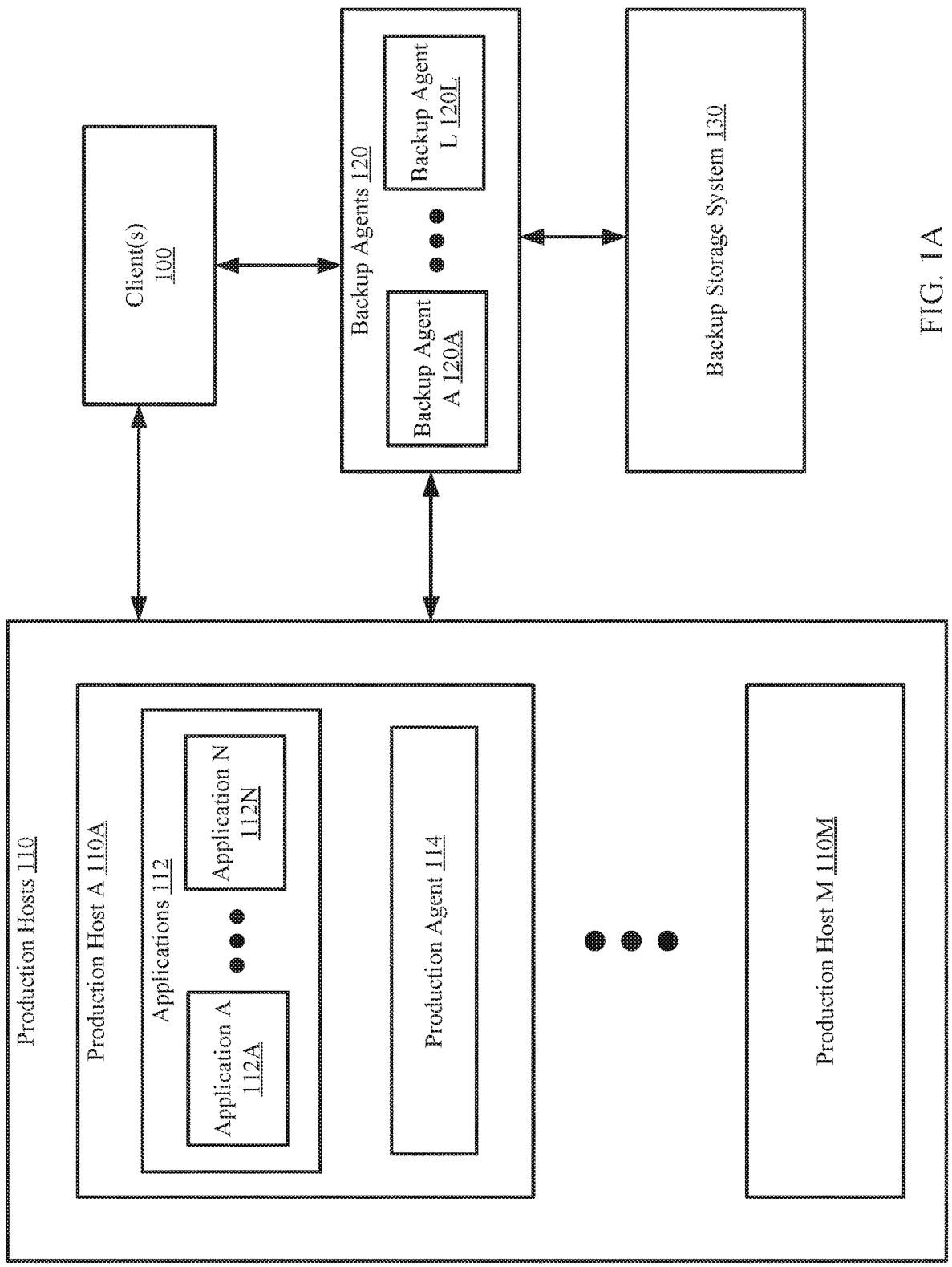
FIG. 1A shows a diagram of a system in accordance with one or more embodiments of the invention.

FIG. 1A shows a diagram of a system in accordance with one or more embodiments of the invention. The system includes clients (100), one or more backup agents (120), one or more production hosts (110) and a backup storage system (130). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the backup agents (120) manage the protection of data generated by the production hosts (110). The backup agents (e.g., 120A, 120L) may manage the protection of data by implementing backup policies for applications (112) executing on the production hosts (110). The backup policies (further discussed in FIG. 1C) may specify when and how to back up the applications (112) and to store the backups in the backup storage system (130).

Figure 4:
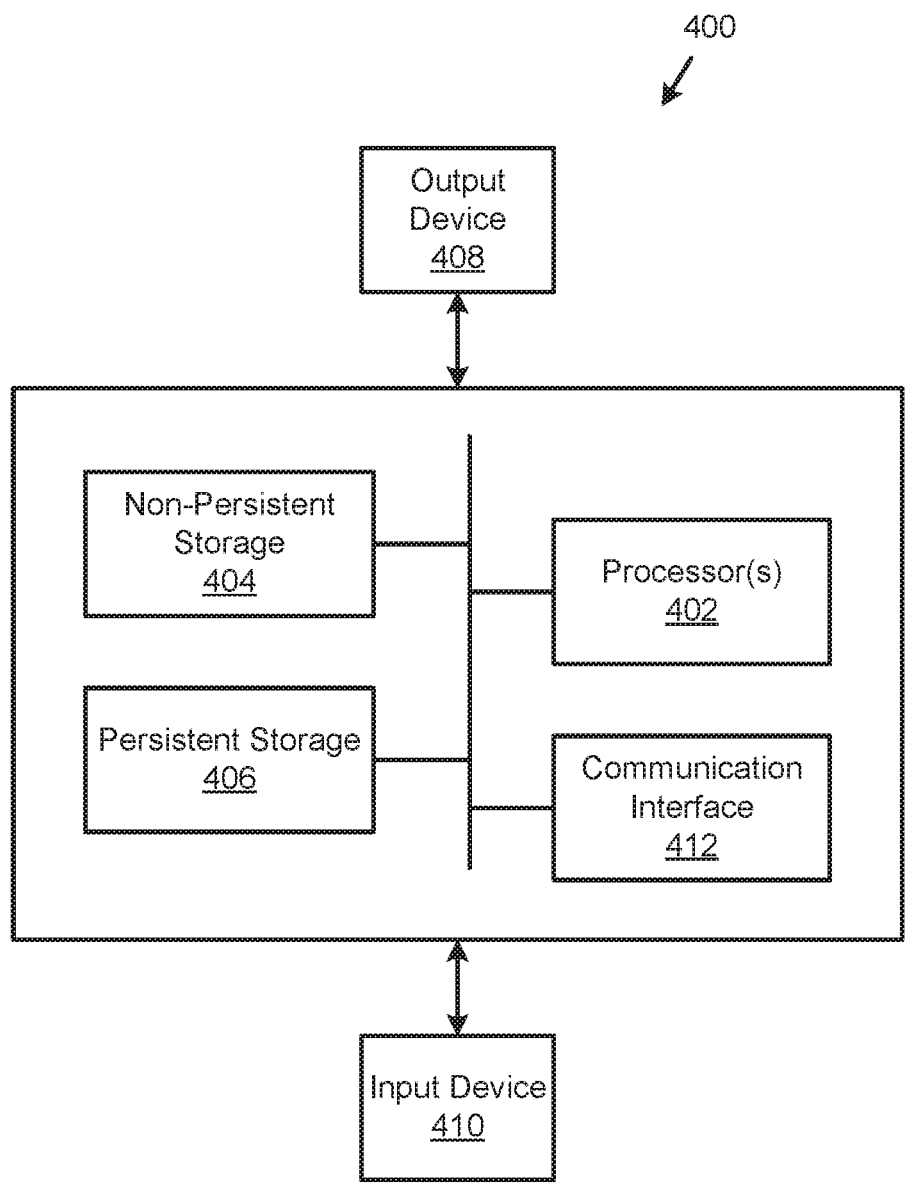
FIG. 4 shows a diagram of a computing device in accordance with one or more embodiments of the invention.

In one or more embodiments of the invention, each backup agent (120A, 120L) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (120A, 120L) described throughout this application and/or all, or a portion thereof, of the methods illustrated in FIG. 2.

In one or more embodiments of the invention, the backup agent (120A, 120L) is implemented as a logical device. The logical device may utilize the computing resources of any number of computing devices and thereby provide the functionality of the backup agent (120A, 120L) described throughout this application and/or all, or a portion thereof, of the methods illustrated in FIG. 2. For additional details regarding the backup agents (120A, 120L), see, e.g., FIG. 1C.

In one or more embodiments of the invention, the client(s) (100) utilize services provided by the production hosts (110) and/or the backup agents (120). Specifically, the client(s) (100) may utilize the applications (112) to obtain, modify, and/or store data. The data may be generated from the applications (112). Further, the client(s) (100) may utilize the backup agents (120) to initiate backups of the applications (e.g., 112). The client(s) may trigger a backup operation performed by the backup agent(s) (120) by sending a backup request to the backup agent (120) that specifies one or more applications. Further, the clients (100) may trigger a generation of storage device clusters (discussed in FIG. 1C) in accordance with FIG. 2.

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the production hosts (110) host applications (112). The applications (112) may be logical entities executed using computing resources (not shown) of the production host (110A, 110M). Each of the applications (112A, 112N) may be performing similar or different processes. In one or more embodiments of the invention, the applications (112) provide services to users, e.g., clients (100). For example, the applications (112) may be categorized based on application types. Examples of application types include, but are not limited to, a database type that is associated with instances of databases, an email server type that is associated with email servers, an email module type that is associated with email modules, a virtual machine type that is associated with virtual machines, a hypervisor type that is associated with hypervisors, and a network management type that is associated with network management systems.

In one or more embodiments of the invention, each application may be identified using an application type identifier. The application type identifier may be a string of numbers, letters, symbols, or any combination thereof that uniquely identifies each application. The application type identifier may be generated by a client (e.g., 150) operated by a user.

In one or more embodiments of the invention, the production host (110A, 110M) includes a production agent (114). The production agent may include functionality for generating backups of one or more applications (142A, 142N), storing the backups in the backup storage system (130), and/or obtaining the backups from the backup storage system (130) when restoring the applications (112A, 112N).

In one or more embodiments of the invention, the production agent(s) (114) may each perform backups of applications in backup sessions. In one or more embodiments of the invention, a backup session is an operation performed by a production agent that includes backing up a predetermined number of applications during the same period of time. The number of applications that may be backed up in a backup session may be determined by, for example, a hypervisor (not shown), a client (e.g., 100), and/or any other entity without departing from the invention. The number of applications backed up in a backup session may be based on the computing resources available to the production agent performing the backup session.

In one or more embodiments of the invention, the production agents (114) may further include functionality for initiating recovery of applications or application data by initiating access to storage devices in the backup storage system (130). The access to the backup storage system (130) (either directly by the production agent or by a backup agent (120A, 120L) as initiated by the production agent) may be monitored by components of the backup storage system (130) (e.g., as discussed in FIG. 1B).

In one or more embodiments of the invention, the production agent (114) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (114) described throughout this application.

In one or more of embodiments of the invention, the production agent (114) is implemented as computer instructions, e.g., computer code, stored on a persistent storage that when executed by a processor of the production host (110A, 110M) causes the production host (110A, 110M) to provide the functionality of the production agent (114) described throughout this application.

In one or more of embodiments of the invention, the applications (112) are implemented as computer instructions, e.g., computer code, stored on a persistent storage (e.g., on a production host (110A)) that when executed by a processor(s) of the production host (110A) cause the production host (110A) to provide the functionality of the applications (112) described throughout this application.

In one or more embodiments of the invention, each of the production hosts (110A, 110N) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110M) described throughout this application.

In one or more embodiments of the invention, each of the production hosts (110A, 110M) is implemented as a logical device. The logical device may utilize the computing resources of any number of computing devices and thereby provide the functionality of the production host (110A, 110M) described throughout this application.

In one or more embodiments of the invention, the backup storage system (130) store backups of the applications (112). The backup storage system (130) may communicate with the backup agents (e.g., 120A, 120L) when obtaining backups to be stored and/or when transferring backups to the production hosts (110) when restoring applications. In one or more embodiments of the invention, a backup is a copy of data associated with an application. A backup may further include additional data that enables a production agent to restore an application associated with the backup from any production host.

In one or more embodiments of the invention, the backup storage system (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (130) described throughout this application.

In one or more embodiments of the invention, the backup storage system (130) is implemented as a logical device. The logical device may utilize the computing resources of any number of computing devices and thereby provide the functionality of the backup storage described throughout this application. For additional details regarding the backup storage system (130), see, e.g., FIG. 1B.

While the backup storage system (130) is described as storing backups of applications, the backup storage system (130), in accordance with embodiments of the invention, may store additional data. The additional data may be application data obtained directly from the applications (e.g., 112). In such embodiments, the applications (e.g., 112) may include functionality for communicating with the backup agents (120) to store the application data as the data is being generated. Further, any data usage of storage devices (discussed in FIG. 1B) by the applications (112) may be monitored as discussed below in FIG. 1B.

Figure 1B:
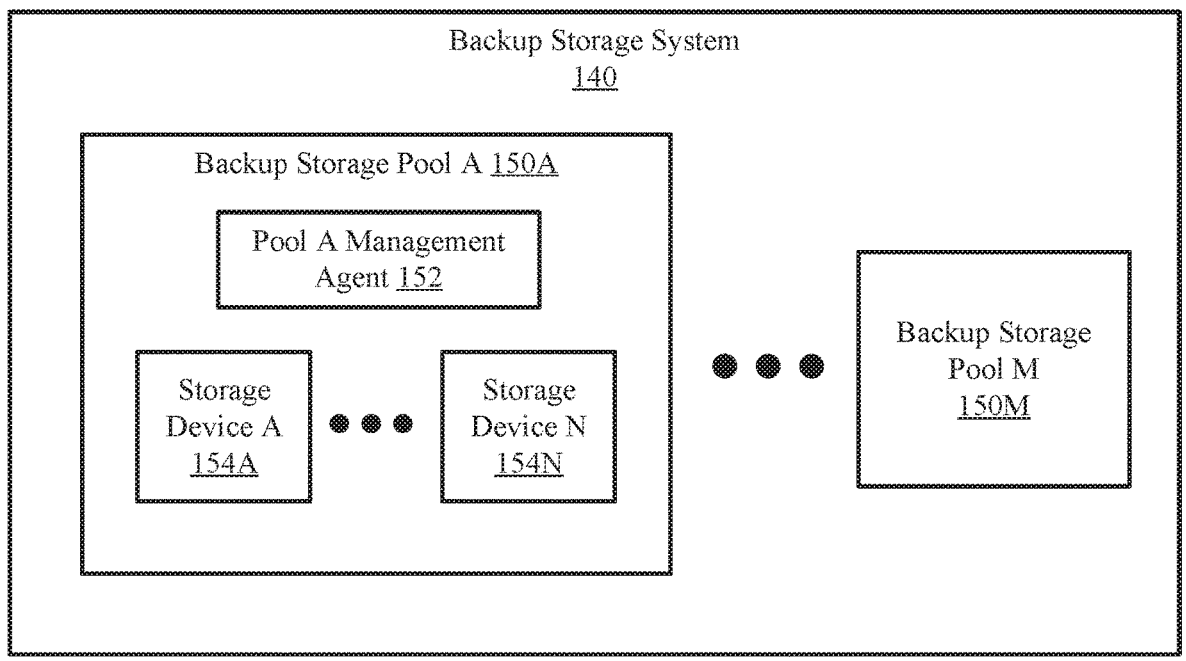
FIG. 1B shows a diagram of a backup storage system in accordance with one or more embodiments of the invention.

FIG. 1B shows a diagram of a backup storage system in accordance with one or more embodiments of the invention. The backup storage system (140) may be an embodiment of the backup storage system (130, FIG. 1A) discussed above. As discussed above, the backup storage system (140) stores backups of applications. To perform the aforementioned functionality, the backup storage system (140) may include one or more backup storage pools (150A, 150M). The backup storage system (140) may include additional, fewer, and/or different components without departing from the invention. Each of the aforementioned components of the backup storage system (140) illustrated in FIG. 1B is discussed below.

In one or more embodiments of the invention, each backup storage pool (150A, 150M) includes a logical grouping of one or more storage devices (e.g., 154A, 154N) and a pool management agent (152).

In one or more embodiments of the invention, the pool management agents (152) monitor the data usage of data in the storage devices (154A, 154N) of the respective backup storage pool (152). The data usage may include data read and or written to by components illustrated in FIG. 1A (e.g., a production agent (114, FIG. 1A) or an application (112A, 112N, FIG. 1A)) without departing from the invention. The monitored data usage may be provided to the backup storage agents (e.g., 120A, 120L, FIG. 1A) as storage device telemetry entries. Each storage device telemetry entry may include data sets associated with the data usage over a period of time.

In one or more embodiments of the invention, each storage device (154A, 154N) stores data. The data may be, for example, backups of applications generated by production hosts. Additionally, the data may be application data. The data may be obtained from backup agents managing the backup storage system (140) and the storage of the backups. Further, the data may be provided to the backup agents (or any other entity accessing the backups). Each storage device (154A, 154N) may be implemented as persistent storage (e.g., disk drives, solid state drives, etc.).

Figure 1C:
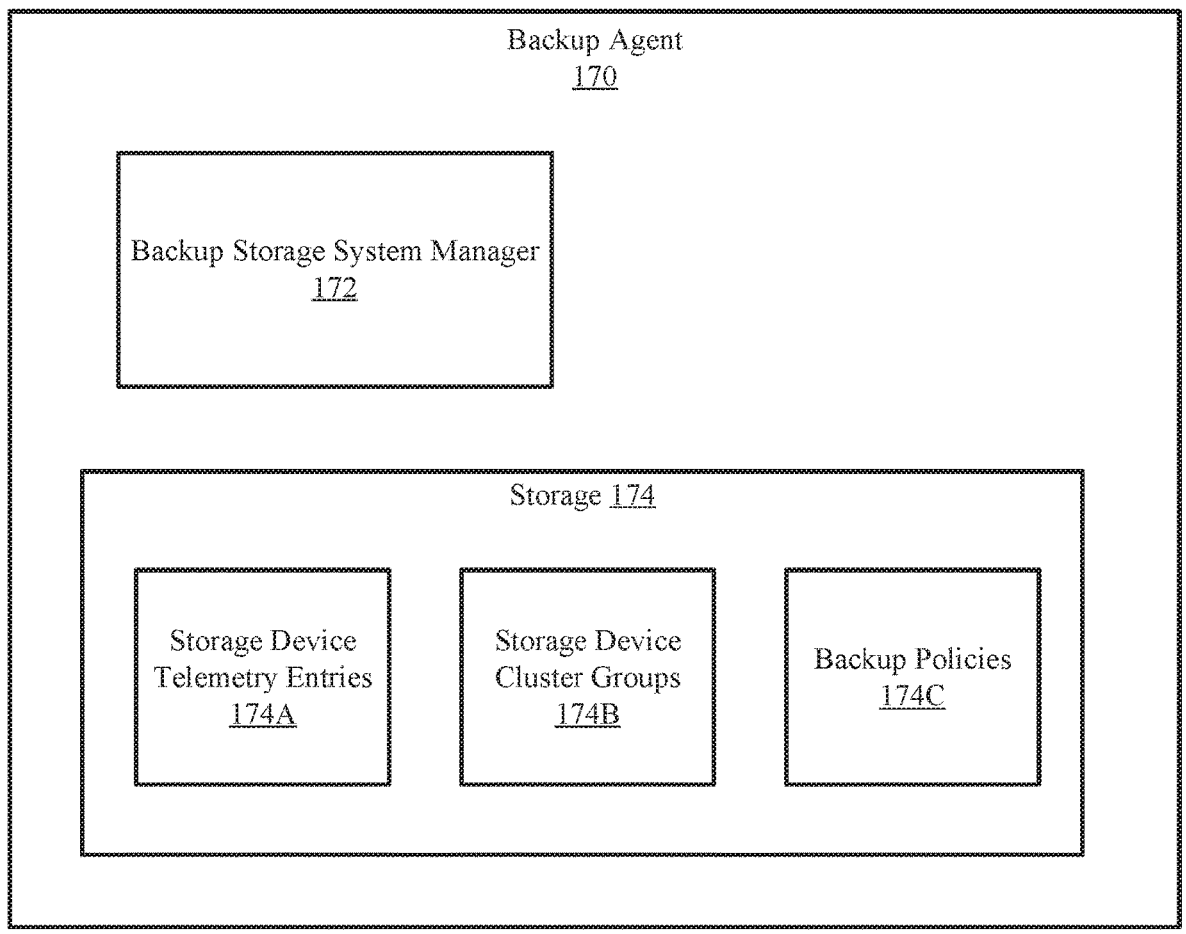
FIG. 1C shows a diagram of a backup agent in accordance with one or more embodiments of the invention.

FIG. 1C shows a diagram of a backup agent (170). The backup agent (170) may be an embodiment of a backup agent (120A, 120L) discussed above. As discussed above, the backup agent (170) may obtain backups of applications to be stored in a backup storage system. To perform the aforementioned functionality, the backup agent (170) may include a backup storage system manager (172) and storage (174). The backup agent (170) may include additional, fewer, and/or different components without departing from the invention. Each of the aforementioned components of the backup storage system (140) illustrated in FIG. 1C is discussed below.

In one or more embodiments of the invention, the backup storage system manager (172) includes functionality for obtaining backups from a production host, determining which storage device to store the backup, and initiating storage of the backup to the determined storage device. Further, the backup storage system manager (172) includes functionality for initiating a backup operation of the backups in accordance with backup policies (174C) stored in the storage (174).

In one or more embodiments of the invention, the backup storage system manager (172) further includes functionality for obtaining storage device telemetry entries (174A). The storage device telemetry entries (174A) may be used to generate the storage device cluster groups (174B) (also referred to simply as "cluster groups") and updating the backup policies (174C) in accordance with FIG. 2.

In one or more embodiments of the invention, the backup storage system manager (172) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup storage system manager (172) described throughout this application and/or all, or a portion thereof, of the method illustrated in FIG. 2.

Figure 2:
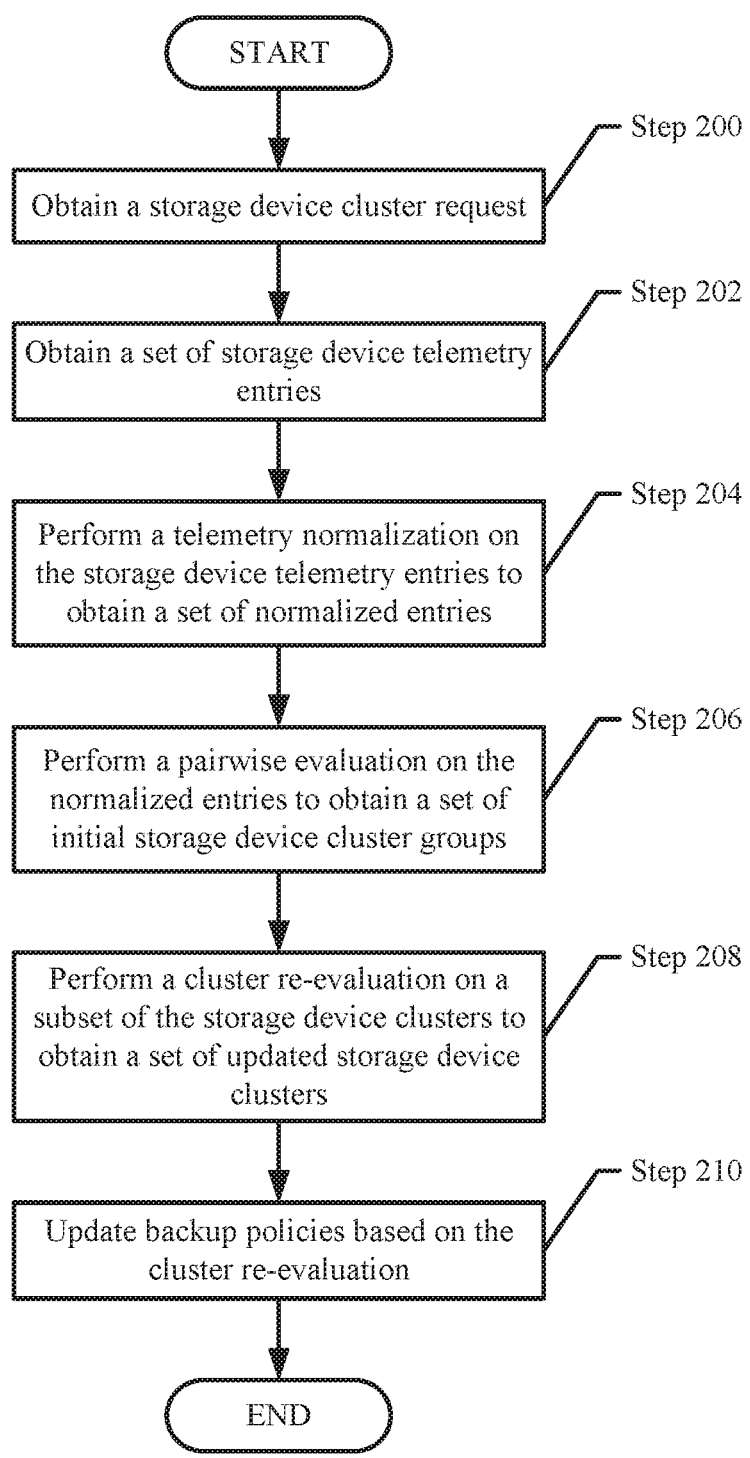
FIG. 2 shows a flowchart for a method for updating backup policies based on a set of storage device clusters in accordance with one or more embodiments of the invention.

In one or more of embodiments of the invention, the backup storage system manager (172) is implemented as computer instructions, e.g., computer code, stored on a persistent storage that when executed by a processor of the backup agent (170) cause the backup agent (170) to provide the functionality of the backup storage system manager (172) described throughout this application and/or all, or a portion thereof, of the method illustrated in FIG. 2.

In one or more embodiments of the invention, the storage (174) stores storage device telemetry entries (174A), storage device cluster groups (174B), and backup policies (174C). The storage (174) may store additional, fewer, and/or different data structures without departing from the invention. Each of the aforementioned data structures illustrated in FIG. 1C is discussed below.

In one or more embodiments of the invention, the storage device telemetry entries (174A) are data structures that specify telemetry associated with the storage devices as provided by the backup storage pools associated with the corresponding storage devices. The storage device telemetry entries (174A) may be organized as time series (e.g., data sets that each specify a variable of a set of variables as functions over time). Examples of variables include, but are not limited to: a read byte rate, a size of data in a file system stored by the storage device, a maximum number of users accessing the storage devices, an amount of data accessed in the storage device, a number of error messages, a total storage capacity usage of the storage device, and a write rate of data to the storage device.

In one or more embodiments of the invention, the storage device cluster groups (174B) is a data structure that specifies the cluster groups as generated in accordance with FIG. 2. The storage device cluster groups (174B) may specify which storage devices in the storage device cluster groups are associated with which cluster group.

In one or more embodiments of the invention, the backup policies (174C) are data structures that specify a schedule for generating backups. The schedule may specify, for example, a frequency in which the backup is generated (e.g., every week, every day, every four hours, etc.). Further, the backup policies (174C) may specify a point in time during the day in which the backup is generated and/or stored in the backup storage system. For example, the backup generation may be specified to be generated during a point in time when a storage device is likely to not be used and/or accessed (e.g., during the night time). The determination about whether the storage device is likely to be used and/or accessed may be determined by the backup storage system manager (172) in accordance with FIG. 2.

While not illustrated in FIG. 1C, the backup agent (170) may further manage cleaning policies. The cleaning policies, as discussed above, specify a schedule for cleaning data in the backup storage system after the data has been stored for a predetermined period of time. The cleaning policies may specify which data objects are maintained in the backup storage system and the application type of each respective data object. The backup storage system manager (172) may utilize the cleaning policies to identify which data is to be cleaned and which backup storage pool such data is stored in. After initiating a cleaning of the data, the corresponding metadata entries stored in the respective backup storage pool metadata mappings (174A, 174M).

FIG. 2 show flowcharts in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2 may be performed in parallel with any other steps shown in FIG. 2 without departing from the scope of the invention.

FIG. 2 shows a flowchart for a method for updating backup policies based on a set of storage device clusters in accordance with one or more embodiments of the invention. The method shown in FIG. 2 may be performed by, for example, a backup agent (170, FIG. 1C). Other components of the system illustrated in FIG. 1A or FIG. 1C may perform the method of FIG. 2 without departing from the invention.

Turning to FIG. 2, in step 200, a storage device cluster request is obtained. In one or more embodiments of the invention, the storage device cluster request may specify the generation of a set of cluster groups based on telemetry associated with storage devices in the backup storage system. Further, the storage device cluster request may specify updating backup policies to perform the generation of the backups and the storage of the backups on optimal points in time.

In step 202, a set of storage device telemetry entries is obtained. In one or more embodiments of the invention, the set of storage device telemetry entries is obtained from storage. Each storage device telemetry entry may be obtained from a pool management agent of a corresponding backup storage pool. As discussed in FIG. 1C, each storage device telemetry entry is associated with a storage device.

In step 204, a telemetry normalization is performed on the storage device telemetry entries to obtain a set of normalized entries. In one or more embodiments of the invention, the telemetry normalization includes dividing each storage device telemetry entry into smaller portions. Each smaller portion may be associated with an equal length of time. The length of time may be determined based on determination of cyclical behavior and/or based on the storage device cluster request obtained in step 200. The equal length of time may be, for example, 24 hours.

In one or more embodiments of the invention, the telemetry normalization may further include performing a smoothening on the data in the smaller portions. In one or more embodiments of the invention, a smoothening refers to a modification to the data that reduces outliers, reduces noise, and/or generates data curves for the data points specified in the smaller portions. The smoothening may be performed using, for example, a discrete convolution. The discrete convolution may include generating curves (e.g., normal curves) adjusted based on subsets of the smaller portions and combining the curves to generate a normalized smaller portion. Each smaller portion that is further modified via the smoothening may be referred to as a normalized entry.

In step 206, a pairwise evaluation is performed on the normalized entries to obtain a set of initial storage device cluster groups. In one or more embodiments of the invention, the pairwise evaluation includes analyzing each pair of normalized entries to calculate a pairwise distance for each pair of normalized entry. In one or more embodiments of the invention, a pairwise distance is a measurement of differences between two functions based on a pairwise distance calculation. Examples of pairwise distance calculations include, but are not limited to: a Manhattan distance calculation, a Euclidean distance calculation, and a dynamic time warping (DTW) calculation.

In one or more embodiments of the invention, the pairwise distances of each pair of normalized entry are used to group the normalized entries into cluster groups. The normalized entries may be grouped using a clustering algorithm that take as inputs the pairwise distances of each pair of normalized entries and outputs a set of initial cluster groups. Examples of clustering algorithms include, but are not limited to: a k-means clustering, a density-based spatial clustering of applications with noise (DBSCAN), and a hierarchical agglomerative clustering.

In one or more embodiments of the invention, after the normalization entries are grouped into cluster groups, the storage devices may be grouped based on the corresponding normalization entries. For example, a storage device may be assigned to a cluster group with the most normalized entries associated with the storage device.

In step 208, a cluster re-evaluation is performed on the storage device cluster groups to obtain a set of updated storage device cluster groups. In one or more embodiments of the invention, the cluster re-evaluation includes determining a first subset (e.g., a first portion of the set) of storage clusters that meet a cluster group criteria, identifying the second cluster groups with a marginal number of storage devices relative to other cluster groups, and re-assigning each storage device to a cluster group from the first subset of storage clusters. The cluster group criteria may specify, for example, a minimum number of storage devices, a maximum number of storage groups with the most storage devices, and/or any other cluster group criteria without departing from the invention.

In step 210, backup policies are updated based on the cluster re-evaluation. In one or more embodiments of the invention, the backup policies are updated by generating a predicted future time window for each cluster group. In one or more embodiments of the invention, the predicted future time window of a cluster group is a function of the variable associated with the cluster group over a period of time of the normalized entries. The function may be a function that most closely specifies the behavior of the storage devices of the corresponding cluster groups. In this manner, the predicted future time windows may be used to determine an period of time in which backup operations are to be initiated. The determination may be performed by identifying a period of time required to perform a storage of data in the backup storage system, finding an available time interval in which the data usage of a storage device cluster group is at a predicted low range, and selecting such time period for each predicted future time window. The backup policies may be updated to reflect the selection of such time windows for each storage device in the backup storage system.

Example

Figure 3A:
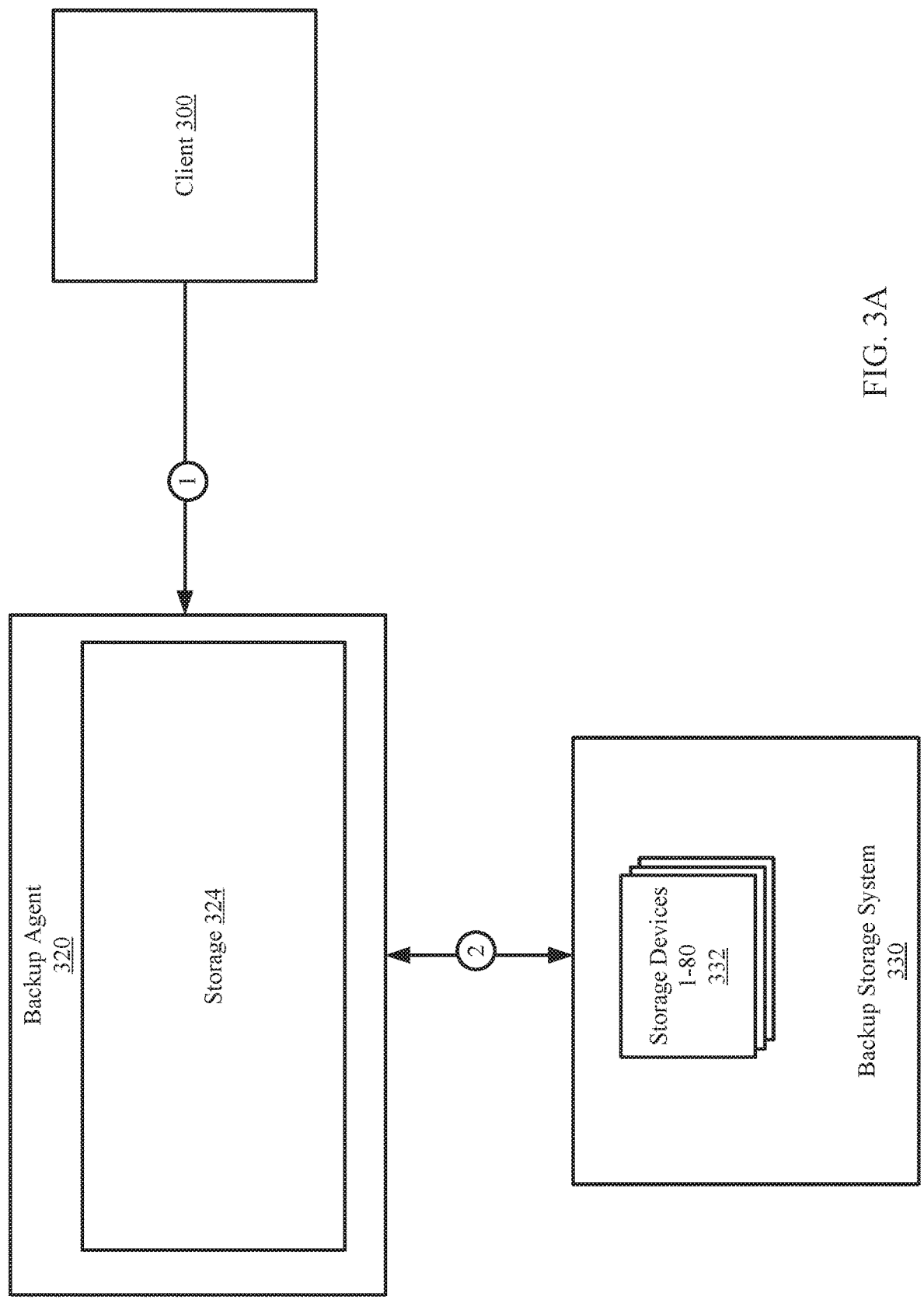

The following section describes an example. The example, illustrated in FIGS. 3A-3D, is not intended to limit the invention. Turning to the example, FIG. 3A shows a diagram of an example system. The example system includes a client (300), a backup agent (320), and a backup storage system (330). For the sake of brevity, not all components of the example system are illustrated in FIG. 3A.

Turning to FIG. 3A, the client (300), which may be an administrative client, desires to set up backup schedules for a set of 80 storage devices (332). The client (300) sends a storage device cluster request to the backup agent (320) [1]. The storage device cluster request specifies generating a set of storage device cluster groups and updating backup policies based on when the data usage in each storage device cluster groups is identified to be at a minimum.

The backup agent (320), in response to the storage device cluster request, performs the method of FIG. 2 and obtains a set of storage device telemetry entries for 80 storage devices (322) in the backup storage system (330) [2].

Figure 3B:
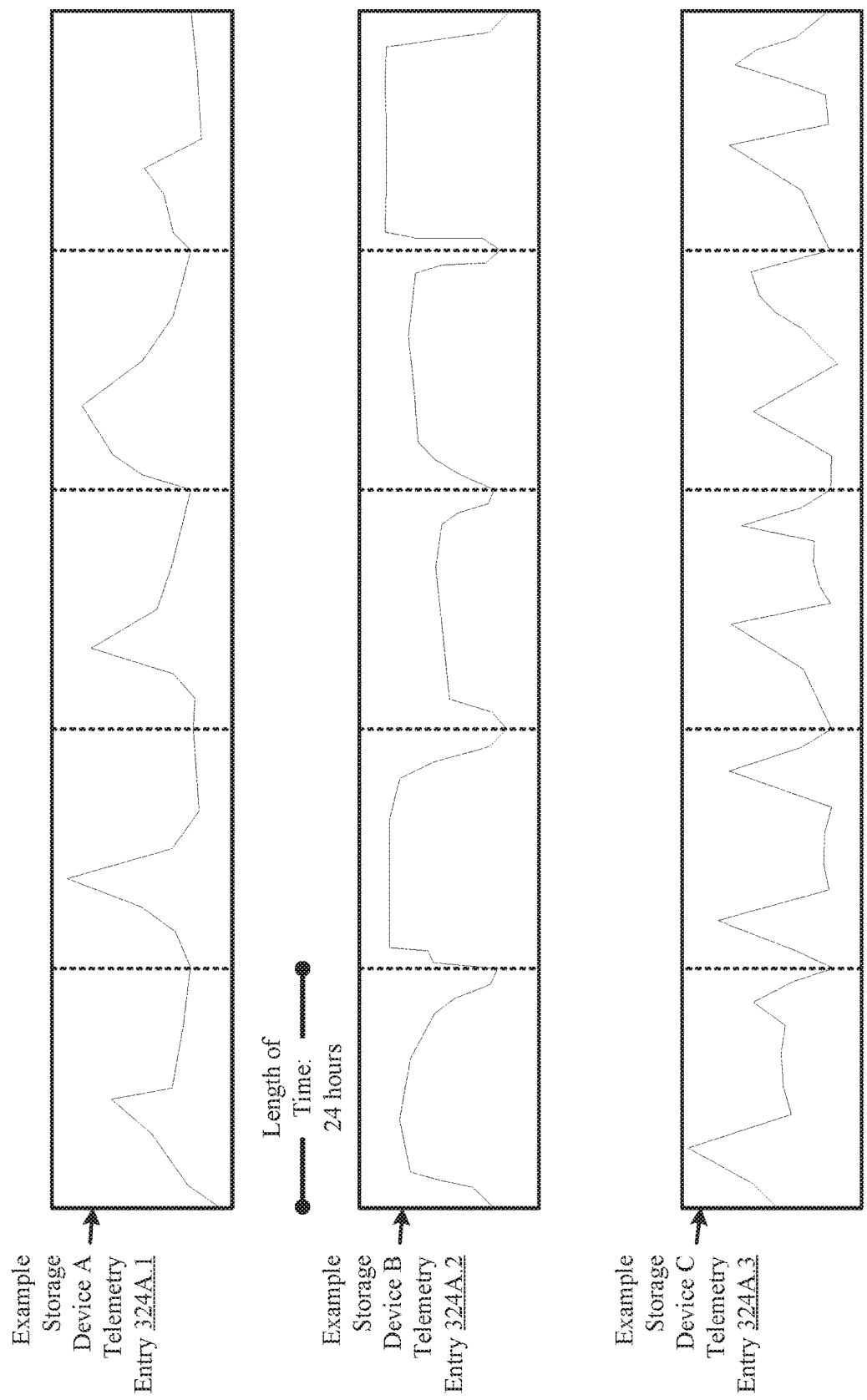

Continuing the example from FIG. 3A, FIG. 3B shows a second diagram of the example system. FIG. 3B shows diagrams of example storage device telemetry entries (324A.1, 324A.2, 324A.3). The example storage device telemetry entries (324A.1, 324A.2, 324A.3) are illustrated as time series that include data usage in a storage device as a function over time. The data usage of each of the storage device telemetry entries (324A.1, 324A.2, 324A.3) may be determined to behave in a cyclical manner, where a similar behavior is repeated after a static length of time. The length of time is identified as 24 hours. Each of the example storage device telemetry entries (324A.1, 324A.2, 324A.3) is divided into smaller portions of equal lengths of time of 24 hours. The divisions may be illustrated using dotted lines.

As illustrated in FIG. 3B, storage device A, as illustrated by example storage device A telemetry entry (324A.1), behaves in a way where the data usage is low at the start of the 24-hour period, peaks toward the middle of the 24-hour period for a short period, and returns to low data usage toward the end of the 24-hour period. Further, storage device B, as illustrated by example storage device B telemetry entry (324A.2), behaves in a way where the data usage stays at a high value for a majority of the middle of the 24-hour period, and is relatively low toward the beginning and end of each 24-hour period. Further, storage device C, as illustrated by example storage device C telemetry entry (324A.3), behaves in a way where the data usage is relatively high for two short periods of time and is relatively low for a large portion of the middle of each 24-hour period.

FIG. 3C shows a diagram of cluster groups (324B) generated in accordance with FIG. 2. Specifically, the cluster groups (324B) are generated by grouping the normalized entries based on a clustering algorithm as discussed in FIG. 2. The cluster groups each specify a portion of the normalized entries in the backup storage system. Each cluster group (324B.1, 324B.2, 324B.3) is associated with a behavior discussed above.

To further clarify the grouping, examples of normalized entries, generated in accordance with FIG. 2, are illustrated for each cluster group (324B.1, 324B.2, 324B.3). Specifically, normalized entries grouped in cluster group A (324B.1) tend to specify a similar behavior of storage device A during each 24-hour period. Further, normalized entries grouped in cluster group B (324B.2) tend to specify a similar behavior of storage device B during each 24-hour period, and the normalized entries grouped in cluster group C (324B.3) tend to specify a similar behavior of storage device C during each 24-hour period.

Figure 3D:
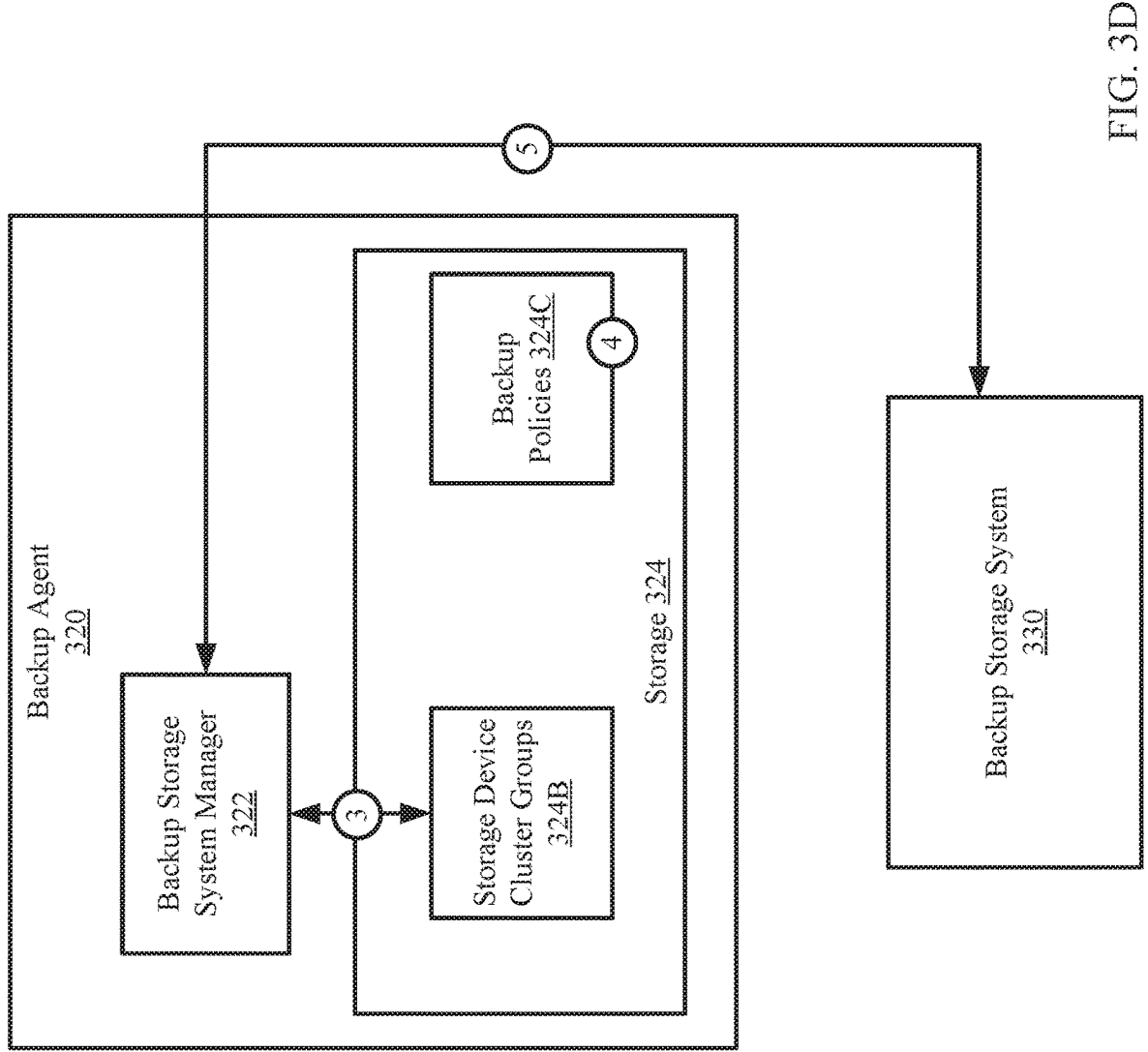

FIG. 3D shows a fourth diagram of the example system. For the sake of brevity, not all components of the example system are illustrated in FIG. 3D. The backup agent (320) of the example system analyzes the storage device cluster groups to generate a predicted future time window in which each storage device cluster group is predicted to utilize data. Each predicted future time window for each storage device cluster group is used determine an optimal period of time in which backup operations are to be performed for the storage devices in each cluster group [3]. Specifically, a period of time is selected for each predicted future time window. The selected period of time for a predicted future time window is one in which the data usage is low for a long enough period of time in which the backup operation may be performed. After making such determinations for each cluster group, the backup policies (324C) are updated to reflect backing up data to the respective storage devices in the selected time periods for each cluster group [4]. At a later point in time, the backup policies are implemented by the backup agent (320) [5]. Specifically, data is transferred to the storage devices in the backup storage system (330) in the respective time periods specified in the backup policies (324C).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing storage devices. Specifically, embodiments of the invention may be used to reduce workload bottlenecking on storage devices by grouping storage devices based on detected workload patterns and/or tendencies throughout cyclical periods of time (e.g., throughout a 24-hour period). The storage devices may be assigned points in time in which a backup is stored in the storage device by determining a point in time in which the storage device is expected to experience low data usage. In this manner, the risk of data loss, data unavailability, data storage latency, and/or data access latency is significantly reduced by intelligently assigning a point in time in which to apply the backup operation workload on a storage device.

Thus, embodiments of the invention may address the problem of inefficient use of computing resources. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing storage devices in a backup storage system, the method comprising:
   obtaining, by a backup agent, a storage device cluster request; and
   in response to the storage device cluster request:
      obtaining a set of storage device telemetry entries associated with a plurality of storage devices;
      performing a telemetry normalization on the storage device telemetry entries to obtain a set of normalized entries;
      performing a pairwise evaluation on the set of normalized entries to obtain a set of initial storage device clusters, wherein a storage device cluster in the set of initial storage device clusters comprises a portion of the plurality of storage devices;

performing a cluster re-evaluation on the set of initial storage device cluster groups to obtain a set of updated storage device clusters;

updating a backup policy based on the set of updated storage device cluster groups; and performing a backup operation on a storage device of the plurality of storage devices based on the backup policy.

2. The method of claim 1, wherein a storage device telemetry entry in the set of storage device telemetry entries comprises a time series of a variable in the set of variables as a function of time.

3. The method of claim 2, wherein each normalized entry in the set of normalized entries comprises a portion of a storage device telemetry entry of the storage device telemetry entry, and wherein each normalized entry in the set of normalized entries is a time series associated with an equal length of time.

4. The method of claim 1, wherein performing the pairwise evaluation comprises:

selecting two normalized entries in the set of normalized entries;

calculating a pairwise distance between the two normalized entries; and assigning a cluster group to a storage device associated with each of the two normalized entries based on the pairwise distance.

5. The method of claim 1, wherein performing the cluster re-evaluation comprises:

determining a first portion of the set of storage device cluster groups based on a cluster group criterion; and assigning each storage device of a second portion of the set of cluster groups to a storage device cluster group of the first portion of the set of storage device cluster groups, wherein each storage device cluster group of the second portion of the set of storage device cluster groups does not meet the cluster group criterion.

6. The method of claim 1, wherein updating the backup policy comprises:

modifying a schedule of the backup policy based on at least one storage device cluster of the storage device cluster, wherein the schedule is determined based on a period of time required to perform a backup operation.

7. The method of claim 1, wherein the set of storage devices are grouped into storage device pools.

8. A non-transitory computer readable medium comprising computer readable program code, which when executed by a computer processor enables the computer processor to perform a method for managing storage devices in a backup storage system, the method comprising:

obtaining, by a backup agent, a storage device cluster request; and in response to the storage device cluster request:

obtaining a set of storage device telemetry entries associated with a plurality of storage devices;

performing a telemetry normalization on the storage device telemetry entries to obtain a set of normalized entries;

performing a pairwise evaluation on the set of normalized entries to obtain a set of initial storage device clusters, wherein a storage device cluster in the set of initial storage device clusters comprises a portion of the plurality of storage devices;

performing a cluster re-evaluation on the set of initial storage device cluster groups to obtain a set of updated storage device clusters;

updating a backup policy based on the set of updated storage device cluster groups; and performing a backup operation on a storage device of the plurality of storage devices based on the backup policy.

9. The non-transitory computer readable medium of claim 8, wherein a storage device telemetry entry in the set of storage device telemetry entries comprises a time series of a variable in the set of variables as a function of time.

10. The non-transitory computer readable medium of claim 8, wherein each normalized entry in the set of normalized entries comprises a portion of a storage device telemetry entry of the storage device telemetry entry, and wherein each normalized entry in the set of normalized entries is a time series associated with an equal length of time.

11. The non-transitory computer readable medium of claim 8, wherein performing the pairwise evaluation comprises:

selecting two normalized entries in the set of normalized entries;

calculating a pairwise distance between the two normalized entries; and assigning a cluster group to a storage device associated with each of the two normalized entries based on the pairwise distance.

12. The non-transitory computer readable medium of claim 8, wherein performing the cluster re-evaluation comprises:

determining a first portion of the set of storage device cluster groups based on a cluster group criterion; and assigning each storage device of a second portion of the set of cluster groups to a storage device cluster group of the first portion of the set of storage device cluster groups, wherein each storage device cluster group of the second portion of the set of storage device cluster groups does not meet the cluster group criterion.

13. The non-transitory computer readable medium of claim 8, wherein updating the backup policy comprises:

modifying a schedule of the backup policy based on at least one storage device cluster of the storage device cluster, wherein the schedule is determined based on a period of time required to perform a backup operation.

14. The non-transitory computer readable medium of claim 8, wherein the set of storage devices are grouped into storage device pools.

15. A system, comprising:

a processor; and memory comprising instructions which, when executed by the processor, perform a method, the method comprising:

obtaining, by a backup agent, a storage device cluster request; and in response to the storage device cluster request:

obtaining a set of storage device telemetry entries associated with a plurality of storage devices;

performing a telemetry normalization on the storage device telemetry entries to obtain a set of normalized entries;

performing a pairwise evaluation on the set of normalized entries to obtain a set of initial storage device clusters, wherein a storage device cluster in the set of initial storage device clusters comprises a portion of the plurality of storage devices;

performing a cluster re-evaluation on the set of initial storage device cluster groups to obtain a set of updated storage device clusters;

updating a backup policy based on the set of updated storage device cluster groups; and performing a backup operation on a storage device of the plurality of storage devices based on the backup policy.

16. The system of claim 15, wherein a storage device telemetry entry in the set of storage device telemetry entries comprises a time series of a variable in the set of variables as a function of time.

17. The system of claim 16, wherein each normalized entry in the set of normalized entries comprises a portion of a storage device telemetry entry of the storage device telemetry entry, and wherein each normalized entry in the set of normalized entries is a time series associated with an equal length of time.

18. The system of claim 15, wherein performing the pairwise evaluation comprises:

selecting two normalized entries in the set of normalized entries;

calculating a pairwise distance between the two normalized entries; and assigning a cluster group to a storage device associated with each of the two normalized entries based on the pairwise distance.

19. The system of claim 15 wherein performing the cluster re-evaluation comprises:

determining a first portion of the set of storage device cluster groups based on a cluster group criterion; and assigning each storage device of a second portion of the set of cluster groups to a storage device cluster group of the first portion of the set of storage device cluster groups, wherein each storage device cluster group of the second portion of the set of storage device cluster groups does not meet the cluster group criterion.

20. The system of claim 15, wherein updating the backup policy comprises:

modifying a schedule of the backup policy based on at least one storage device cluster of the storage device cluster, wherein the schedule is determined based on a period of time required to perform a backup operation.

* * * * *